Patented Dec. 5, 1922.

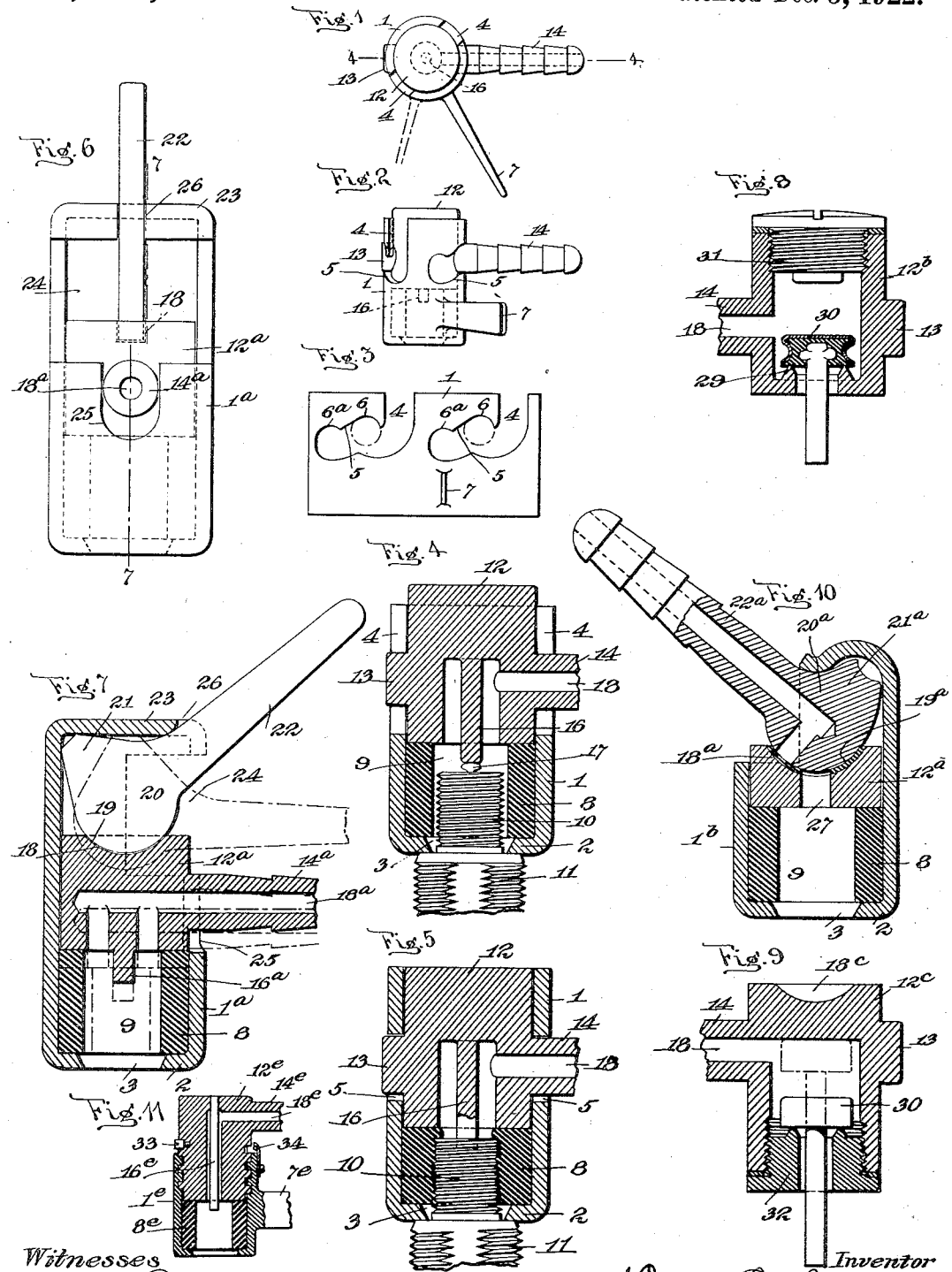

1,437,940

UNITED STATES PATENT OFFICE.

HARRY E. HEATH, OF LONG ISLAND CITY, NEW YORK, ASSIGNOR TO AUTOMATIC SAFETY TIRE VALVE CORPORATION, OF NEW YORK, N. Y., A CORPORATION OF NEW YORK.

COUPLING.

Application filed May 15, 1920. Serial No. 381,644.

*To all whom it may concern:*

Be it known that I, HARRY E. HEATH, a citizen of the United States, and a resident of Long Island City, county of Queens, and State of New York, have invented a new and useful Coupling, of which the following is a specification.

The invention relates to devices for coupling tubes, pipes and the like, and more particularly to devices for connecting a source of air supply, such as a pump or reservoir of compressed air, to the valve of a pneumatic tire. The invention is directed to the type of device illustrated and described in Patent 1,299,398 of April 1, 1919.

The objects of the invention are to provide a coupling which may be permanently attached to the source of supply and quickly, easily and securely attached to the nipple of a pneumatic tire without the use of tools, which may be made of the minimum number of parts, and wherein springs, and the like, will be dispensed with, and which will be cheap to manufacture, will not easily get out of order, may be easily removed from the tire valve, and will, when in position, effectually prevent leakage between the source of supply and the tire valve.

A further object is to provide a device wherein the outlet from the source of supply will be automatically cut off when the device is detached from the tire valve.

These and further objects will more fully appear in the following specification and accompanying drawings considered together or separately.

One embodiment of the invention is illustrated in the accompanying drawings in which like parts in all of the several figures are designated by corresponding characters of reference, and in which—

Fig. 1 is a plan view of a coupling made in accordance with my invention.

Fig. 2 is a side elevation of the same.

Fig. 3 is a developed side elevation of the exterior surface of the shell or cylinder.

Fig. 4 is a longitudinal section, on an enlarged scale, the section being taken on the line 4—4 of Fig. 1.

Fig. 5 is a similar view showing the parts in locked position.

Fig. 6 is a side elevation of a modification.

Fig 7 is a section on the line 7—7 of Fig. 6.

Fig. 8 is a longitudinal section of a modified form of plunger.

Fig. 9 is a similar view of a slightly modified form of plunger.

Fig. 10 is a longitudinal sectional view of a modified form of coupling.

Fig. 11 is a section of a further modification.

In carrying out the invention, a cylindrical shell or body 1 is provided. The body is provided with a longitudinal bore open at one end, which may be termed the top. The opposite end of the body is provided with a head 2 in which is an opening 3 in axial alignment with the bore. In the cylindrical wall of the body are two oppositely disposed bayonet slots, each composed of a longitudinal passage 4 and an inclined portion 5. In the upper wall of the portion 5 and in proximity to the passage 4 is a notch 6 and at the extremity of the inclined portion is a similar notch 6$^a$. The body 1 is also provided with a radially extending arm or handle 7.

Carried within the bore of the body 1, is a tubular block 8 of compressible material, such as soft rubber. The exterior diameter of the block is such as to form a close fit within the bore of the body. The bore 9 of the block is of such a diameter that it freely receives the upper, reduced threaded extremity 10 of a check valve tube 11. The block rests upon the head 2 of the body 1, and the bore 10 is in alignment with the opening 3, which latter is of a size sufficient to receive the nipple 10 but is smaller than the tube 11 whereby the movement of the body 1 over the nipple will be arrested by the end of the tube.

Carried within the body 1 is a cylindrical compression member or plunger 12 which has a working fit with the bore of the body. The plunger is provided with diametrically disposed trunnions 13 and 14 adapted to engage with the bayonet slots in the body 1. The plunger is provided with a chamber 15 open at the bottom, and with a finger 16 which projects beyond the bottom of the plunger and into the bore of the block 8, upon which block the plunger rests. The extremity of the finger 16 is adapted to engage the upper end of the stem 17 of a check valve carried within the valve tube 11. The check valve may be of any desired construction and is not illustrated herein.

The trunnion 14 is extended to considerable length and its periphery is serrated, as is common, for the attachment of a flexible tube offering communication to a source of compressed air supply. The said trunnion is provided with a bore 18 which communicates with the chamber 15.

In the modification illustrated in Figures 6 and 7 the plunger 12ª is provided with a nipple 14ª corresponding to the trunnion 14. The upper face of the plunger 12ª has an arc-shaped recess 18 with which cooperates the concentric face 19 of a cam member 20 which is provided with a spur 21 and an operating handle 22.

The body 1ª of the said modification has a head 23 at its upper end, and the said spur 21 is adapted to cooperate with said head, to depress the plunger when the handle 22 is depressed. One side of the body is cut away, as at 24, whereby the plunger 12ª may be inserted in, and removed from the body, and the said opening 24 has an extension 25 to receive the nipple 14ª and permit of relative movement of the plunger and body. A smaller extension 26 at the upper side of the opening 24 is adapted to receive the handle 22 when the latter is elevated.

In the modification, shown in Fig. 10 the integral nipple 14ª is dispensed with and the handle of the cam member 20ª is adapted to receive the tube from the source of supply. The plunger 12 has a duct 27, and the bore 18ª of the handle may be brought into communication with said duct, and air may flow therethrough into the chamber of the plunger 12ᵇ and thence to the tire valve tube. The spur 21ª is provided with a socket 28 adapted to cooperate with projection on the head of the body 1ᵇ to lock the plunger in its lowered position. The recess 18ª may be provided with suitable lining whereby an air tight joint will be produced.

In the embodiment of the invention shown in Fig. 10, when the handle is depressed to compress the block 8 around the nipple 10 as shown in Fig. 5, the air flows from the source, through the bore 18ª, duct 27 and plunger 12ª, past the check valve in the tube 11 into the tire tube. When the handle is moved upward to release the body from the nipple the air supply will be automatically cut off.

In Figures 8 and 9 are illustrated forms of plungers for use in connection with the bodies shown in Figures 1 to 7 and in which the supply of air will be cut off when the coupling is removed from the tire valve nipple.

In Figure 8 the plunger 12ᵇ has a valve seat 29 in its lower extremity, with which a valve 30 cooperates. The stem of the valve 30 extends through the valve seat. The opposite end of the plunger is closed by a screw threaded plug 31 so proportioned that when the valve is unseated and in contact with the plug, the extremity of the valve stem will extend below the bottom of the plunger to cooperate with the stem of the tire valve.

In Figure 9 the plug 32 is in the bottom of the plunger and carries the valve seat. The operation of the plunger shown in Figure 9 is identical with that shown in Figure 8.

The operation is as follows:—

It is to be understood that when the form of device illustrated in Figures 1 to 7 is employed in connection with a reservoir of compressed air, a valve, not shown, is provided, whereby the supply of air is cut off when the coupling is not in use. When employed in connection with a pump such valve is omitted as no air will be supplied except when the pump is operated.

The block 8 is placed in the bottom of the body 1 with its bore in alignment with the opening 3. The plunger 12 is positioned over the body with the trunnions 13 and 14 in line with the passages 4 and is moved into the body until it contacts with the top of the block. Pressure is applied to the plunger whereby the block is compressed longitudinally to a slight extent. The plunger is now rotated slightly and the elasticity of the block will force the trunnions upward into the notches 6. This will lock the plunger in the body.

When in use the body is placed over the nipple of the tire valve as shown in Figure 4. The handle 7 and element 14 are grasped with the hands, and are moved away from each other as shown in dotted lines, Figure 1. This will cause the trunnions to be moved downward by contact with the inclined walls 5 of the bayonet slots and the block 8 will be compressed longitudinally.

As the wall of the body will not permit the block to expand outwardly due to the pressure of the plunger, the said block will expand inwardly and reduce the bore thereof. This will cause the reduced bore of the block to tightly hug the nipple 10 and be forced into the groove of the threads thereon.

The downward movement of the plunger due to the engagement of the trunnions with the inclined portion 5 of the bayonet slots will engage the finger 14 with the upper end of the stem of the tire valve and unseat the same and the air will flow from the source of supply into the tire tube.

When the trunnions reach the ends of the bayonet slots, the elasticity of the block will force them upward into the notches 6ª. The upward expansion of the block to engage the trunnions with the notches 6ª will not be sufficient to release the block from the nipple 10, and the coupling will be locked in position on the nipple.

When the tire is inflated to the desired extent, the handle 7 and the element 14 are moved toward each other, and the trunnions riding upward in the bayonet slots will release the pressure on the block. When the handle reaches the position shown in full lines, Figure 1, the trunnions will be snapped into the notches 6 and the operation will stop the movement of the handle.

The block 8 being released from the pressure of the plunger will expand longitudinally to its original length, and the bore thereof will resume its normal diameter and release itself from the nipple 10, and the coupling may be removed from the nipple by movement in the direction longitudinally of the tube 11.

When a plunger such as illustrated in Figures 8 and 9 is employed, it will be positioned in the body as before and the pressure of the air in the source will seat the valve 30. When the plunger is forced home on the block, the engagement of the stem of the valve 30 with the stem of the tire check-valve will unseat the valve 30 and the latter will be moved upward until it engages the plug 31, or the head of the body as the case may be, and the continued downward movement of the plunger will cause the stem of the valve 30 to unseat the tire valve as before.

In the forms of the device shown in Figures 6, 7 and 10, the plunger may be inserted in the body through the opening 24 therein, and the cam member 20 or 20ª may be placed in position by compressing the block 8, and the resiliency of the block will retain the cam member in position.

In the modification illustrated in Figure 11, the upper portion of the body 1ᵉ is provided with an interior thread adapted to be engaged by the threaded lower extremity of the plunger 12ᵉ. A longitudinal recess extends from the bottom of the plunger and is in communication with the bore 18ᵉ of the nipple 14ᵉ, and a pin 16ᵉ extends through the recess and beyond the lower end of the plunger.

A stop, such for example as a screw 33 is preferably carried by the plunger and adapted to engage an abutment 34 on the body 1ᵉ, to prevent accidental removal of the plunger from the body. The abutment illustrated is a spring member which may be moved from the path of the stop to assemble or disassemble the device. Preferably one side of the stop is beveled whereby when the plunger is rotated to enter the body the engagement of the stop with the beveled surface will move the abutment from the path of the stop.

In accordance with the provisions of the patent statutes, the principle of the invention has been described, together with what is now considered to be the best embodiment thereof, but it is to be understood that the invention may be carried out in other ways.

Having now described the invention what is claimed and desired to be secured by Letters Patent, is:

1. A device of the character described, comprising a tubular body adapted to receive a tire valve nipple, a flexible tubular member within the body and adapted to surround the nipple, there being a pair of oppositely disposed bayonet slots in the wall of the body, said slots having cam shaped walls, a recessed element carried within the body and in engagement with the end of the member, diametrically opposed projections on the element and extending through the bayonet slots, whereby said element may be rotated relatively to the body, the engagement of the projection with the cam walls of the slots moving the element longitudinally of the body and compressing the member longitudinally thereby reducing the diameter of the bore of the member and engaging the same with the nipple, one of said projections being tubular, whereby air may be admitted to the element.

2. A device of the character described, comprising a tubular body adapted to receive the nipple of a tire valve, a flexible tubular element within the body and surrounding the nipple, a pair of L-shaped slots in the wall of the body, one arm of each of said slots extending longitudinally of the body and extending to the end thereof, the lateral arms of the slots being inclined to form cam surfaces, a recessed cylindrical element carried within the body and resting on the member and in communication with the bore of the member, projections on the cylindrical surface of the element, said projections engaging the slots, means for rotating the element relatively to the body, the engagement of the projections with the inclined slots moving the element longitudinally of the body to compress the member to clutch the nipple, a finger projecting from the element and adapted to engage the stem of the tire valve within the nipple whereby the longitudinal movement of the element will unseat the tire valve.

3. A device of the character described, comprising a tubular body adapted to receive the nipple of a tire valve, a flexible tubular element within the body and surrounding the nipple, a pair of L-shaped slots in the wall of the body, one arm of each of said slots extending longitudinally of the body and extending to the end thereof, the lateral arms of the slots being inclined to form cam surfaces, a recessed cylindrical element carried within the body and resting on the member and in communication with the bore of the member, projections on the cylindrical surface of the element, said projections engaging the slots, means for rotating the element relatively to the body, the engagement of the projections with the inclined slots moving the element longitudinally of the body to compress the member to clutch the nipple, means for admitting air to the bore of the element, a valve carried by the element, the stem of said valve extending from the element and adapted to engage the stem of the tire valve in the nipple whereby the longitudinal movement of the element will unseat the said element valve, a stop for the element valve whereby continued movement of the element will unseat the tire valve.

This specification signed and witnessed this 23rd day of April, 1920.

HARRY E. HEATH.

Witnesses:
  SAMUEL KAHN,
  THOS. F. McGEE, Jr.,